(12) United States Patent
Domenech-Llopis et al.

(10) Patent No.: US 10,167,809 B1
(45) Date of Patent: Jan. 1, 2019

(54) MULTI-PULSE FUEL INJECTION SYSTEM AND CONTROL LOGIC FOR INTERNAL COMBUSTION ENGINE ASSEMBLIES

(71) Applicant: GM GLOBAL TECHNOLOGY OPERATIONS LLC, Detroit, MI (US)

(72) Inventors: Vicente Domenech-Llopis, Rochester Hills, MI (US); Richard C. Peterson, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/660,584

(22) Filed: Jul. 26, 2017

(51) Int. Cl.
  *F02B 3/00* (2006.01)
  *F02D 41/40* (2006.01)
  *F02D 41/38* (2006.01)

(52) U.S. Cl.
  CPC ...... *F02D 41/403* (2013.01); *F02D 2041/389* (2013.01)

(58) Field of Classification Search
  CPC ...... F02D 41/40; F02D 41/402; F02D 41/403; F02D 41/405
  USPC ................. 123/299, 300, 304, 305, 478, 480
  See application file for complete search history.

(56) References Cited

U.S. PATENT DOCUMENTS

| | | | |
|---|---|---|---|
| 6,752,131 B2 | 6/2004 | Poola et al. | |
| 6,994,072 B2 | 2/2006 | Kuo et al. | |
| 7,128,047 B2 | 10/2006 | Kuo et al. | |
| 7,367,313 B2 | 5/2008 | Chang et al. | |
| 7,689,343 B2 | 3/2010 | Dagci et al. | |

(Continued)

*Primary Examiner* — John Kwon
(74) *Attorney, Agent, or Firm* — Quinn IP Law

(57) ABSTRACT

Disclosed are multi-pulse fuel injection systems, control logic for operating such systems, and direct-injection engines having multi-pulse fuel delivery capabilities. A method is disclosed for operating the fuel injection system of an internal combustion engine (ICE) assembly. The method includes a vehicle controller transmitting command signals to the fuel injectors to inject a first pilot quantity of fuel ($Q_{P1}$) and, subsequently, inject a second pilot quantity of fuel ($Q_{P2}$), distinct from $Q_{P1}$, after a first dwell time between $Q_{P1}$ and $Q_{P2}$ during a single combustion cycle of the ICE assembly. The vehicle controller also transmits command signals to the fuel injectors to inject a third pilot quantity of fuel ($Q_{P3}$), greater than $Q_{P1}$ and $Q_{P2}$, after a second dwell time between $Q_{P2}$ and $Q_{P3}$, and then inject a fourth pilot quantity of fuel ($Q_{P4}$), less than $Q_{P3}$, after a third dwell time between $Q_{P3}$ and $Q_{P4}$ during the combustion cycle.

20 Claims, 3 Drawing Sheets

(56) References Cited

U.S. PATENT DOCUMENTS

| | | | |
|---|---|---|---|
| 8,210,158 B2 | 7/2012 | Kang et al. | |
| 8,316,818 B2 | 11/2012 | Ramappan et al. | |
| 8,347,860 B2 | 1/2013 | Kang et al. | |
| 9,551,248 B2 | 1/2017 | Warey et al. | |
| 2009/0150044 A1* | 6/2009 | Topinka | F02D 41/402 |
| | | | 701/103 |
| 2010/0116243 A1* | 5/2010 | Koyama | F02D 41/345 |
| | | | 123/299 |
| 2010/0294232 A1 | 11/2010 | Otterstrom | |
| 2013/0080026 A1 | 3/2013 | Kang et al. | |
| 2015/0020769 A1* | 1/2015 | Huang | F02B 7/08 |
| | | | 123/305 |
| 2016/0326970 A1* | 11/2016 | Fei | F02D 19/061 |
| 2018/0058367 A1* | 3/2018 | Ottikkutti | F02D 41/403 |

* cited by examiner

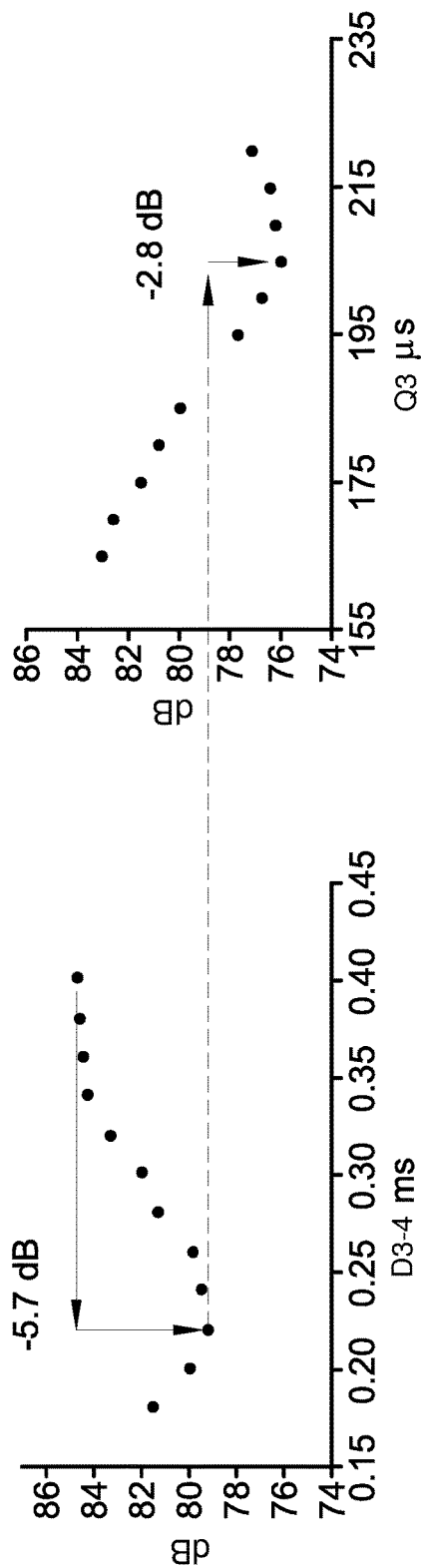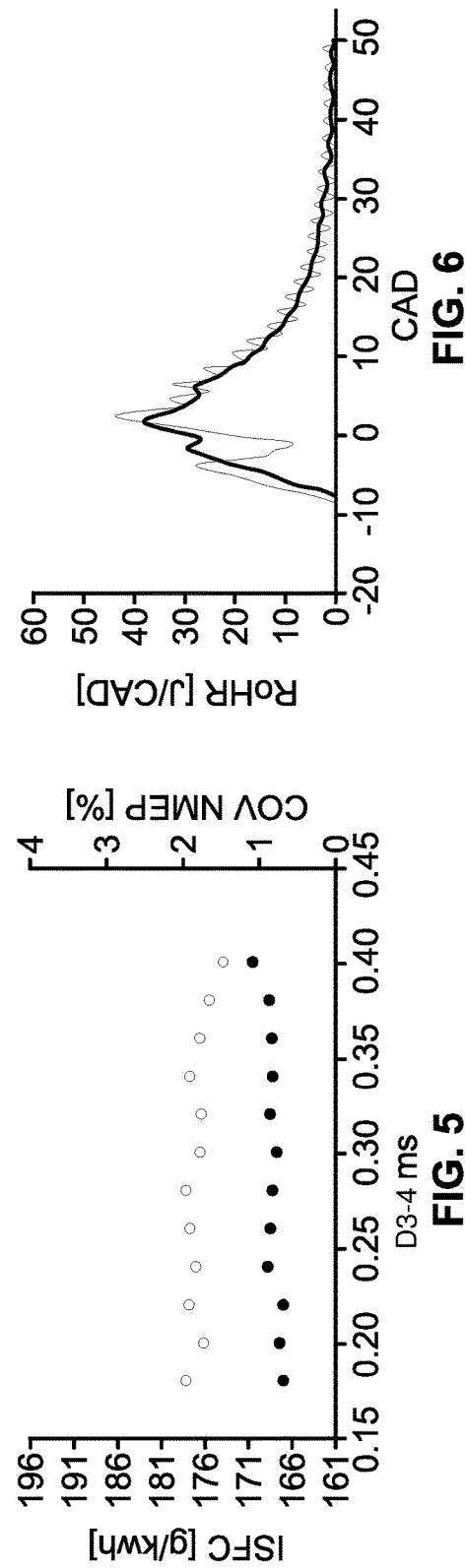

MULTI-PULSE FUEL INJECTION SYSTEM AND CONTROL LOGIC FOR INTERNAL COMBUSTION ENGINE ASSEMBLIES

The present disclosure relates generally to internal combustion engine (ICE) assemblies. More specifically, aspects of this disclosure relate to fuel injection systems and control strategies for reciprocating-piston type internal combustion engines.

Current production motor vehicles, such as the modern-day automobile, are originally equipped with a powertrain that operates to propel the vehicle and power the onboard vehicle electronics. In an automobile, the powertrain is generally typified by a prime mover that delivers driving power to the vehicle's final drive system (e.g., rear differential, axle, and wheels) through a manually or automatically shifted multi-speed power transmission. Automobiles have traditionally been powered by a reciprocating-piston type internal combustion engine (ICE) assembly because of its ready availability and relatively inexpensive cost, light weight, and overall efficiency. Such engines include two and four-stroke compression-ignited (CI) diesel engines, four-stroke spark-ignited (SI) gasoline engines, six-stroke architectures, and rotary engines, as some non-limiting examples. Hybrid vehicles, on the other hand, utilize alternative power sources, such as battery powered electric motor-generators with an engine, to propel the vehicle to minimize reliance on the engine for power and thereby increase overall fuel economy.

Four-stroke engines conventionally operate—as the name suggests—in four distinct stages or "strokes" to drive the engine's crankshaft. At one such (first) stage of operation, known as the "intake stroke," pressurized air is introduced into each cylinder as the corresponding piston travels rectilinearly from top-to-bottom along the length of the cylinder bore. Valve train intake valves are opened such that a pressure gradient generated by the downward-travelling piston draws air into the combustion chamber. During a subsequent (second) stage, known as the "compression stroke," the intake and exhaust valves are closed as the piston travels from bottom-to-top and compresses the air. Near top dead center, a metered quantity of finely atomized fuel may be introduced into the chamber via a fuel injector. Upon completion of the compression stroke, another (third) stage or "power stroke" commences when a spark plug or in-chamber pressure ignites the compressed fuel and air, with the resultant explosive expansion of gases pushing the piston back to bottom dead center (BDC). During a successive stage—most commonly known as the "exhaust stroke"—the piston once again returns to top dead center (TDC) with the exhaust valves open; the travelling piston expels the spent air-fuel mixture from the combustion chamber. The four strokes of a single working cycle requires two revolutions of the crankshaft to complete.

There are two primary types of fuel injection systems common for modern internal combustion engine assemblies—port injection and direct injection. Port fuel injection (PFI), or "multipoint injection" (MPI), sprays fuel into the intake ports upstream from the intake valves where it mixes with incoming air before entering the cylinders. Direct-ignition (DI) engines, on the other hand, employ dedicated fuel injectors that are mounted to the cylinder head and inject fuel directly into the combustion chambers. Conventional DI systems control the injectors to infuse a single pulse of pressurized fuel-air mixture into the combustion chamber and, following the compression stroke, ignite the condensed fluid mixture when the piston is at top dead center of the piston stroke. Fuel injection pulse modulation can be optimized to produce different combustion characteristics and, thus, improved engine performance. Some direct-injection engines, both gasoline and diesel architectures, employ electrically-actuated fuel injectors to deliver multiple consecutive fuel pulses per single combustion event to vary cylinder charge composition and temperature. In such multi-pulse delivery control systems, variation of the injector current profiles—and thus the fuel pulse profiles—of consecutive fuel pulses in a single combustion chamber can provide more precise control of the overall fuel delivery. This, in turn, can help to meet more stringent vehicle emission and fuel economy requirements. Multi-pulse fuel delivery can also be utilized to produce rapid catalytic light-off and to provide a lean homogeneous fuel mixture.

SUMMARY

Disclosed herein are multi-pulse fuel injection systems and related control logic for internal combustion engine assemblies, methods for using such fuel injection systems, direct-injection engines having multi-pulse fuel delivery capabilities, methods for operating such engines, and motor vehicle equipped with such engines. By way of example, and not limitation, there is presented a novel strategy for applying multiple-pulse injection patterns, e.g., in four-stroke DI diesel engines to reduce combustion noise and fuel consumption while improving emissions with little increase in calibration effort. Using experimental engine studies and injection system characterization, multi-pulse injection strategies are proposed with patterns implementing five consecutive fuel pulses per combustion cycle. Optimal injection pattern quantity per working cycle may require two initial pilot pulse quantities $Q1$, $Q2$ and a post pilot pulse quantity $Q5$ with approximately 8-10% of total fuel injection quantity (QT), one auxiliary pulse quantity $Q3$ with approximately 20-30% QT, and a main pulse $Q4$ with approximately 40-50% QT, where $QT=Q1+Q2+Q3+Q4+Q5$ (injected in that order in a single cycle). In at least one desired implementation, $Q1$, $Q2$, and $Q5$ are each about 9% QT, whereas $Q3$ is about 25% QT, and $Q4$ is about 48% QT. Electric separation (dwell) time $D1$-$2$ between $Q1$ and $Q2$, $D2$-$3$ between $Q2$ and $Q3$, and $D4$-$5$ between $Q4$ and $Q5$ can be approximately 0.3-0.5 ms (or about 0.4 ms, in some embodiments). Splitting the cycle into several parts helps to lower peak heat release rate and combustion noise.

Attendant benefits for at least some of the disclosed concepts include reduced engine combustion noise, e.g., a decrease of about 6-9 decibels (dB) at representative light-load key points using a 5-pulse injection train for a direct-acting diesel engine at 1500-2000 RPM and 2 to 12 Bar BMEP. Aspects of the disclosed concepts also help to minimize the number of engine tests that need to be completed for system design, development, and calibration. Disclosed fuel injection systems, control logic, and engine assemblies facilitate optimum combustion timing for CA50 (crankshaft angle where 50% of injected fuel has burned) with an improvement in fuel consumption. Multiple-injection patterns are presented that facilitate the use of low and constant swirl ratios which, in turn, reduce heat loss and cost while improving the control over Rate of Heat Release (RoHR). Lower EISOOT (Emission Index of Soot) with shorter dwell due to better soot oxidation is enabled by decreasing overall combustion duration.

Aspects of the present disclosure are directed to control algorithms for governing operation of multi-pulse fuel injection systems for direct-injection engines. Disclosed, for example, is a method for operating a fuel injection system of an internal combustion engine assembly. This ICE assembly includes multiple cylinders, each with a respective piston reciprocally movable therein, and multiple fuel injectors, each of which is operable to inject multiple pulses of fuel per working combustion cycle into a respective one of the cylinders. The method includes, in any order and in any combination with any of the disclosed features, an onboard or remote vehicle controller transmitting to the fuel injectors: a (first) command signal to inject a (first) pilot quantity of fuel ($Q_{P1}$) during a single combustion cycle of the ICE assembly; a (second) command signal to inject another (second) pilot quantity of fuel ($Q_{P2}$), distinct from $Q_{P1}$, after a (first) calibrated dwell time ($T_{D1}$) between $Q_{P1}$ and $Q_{P2}$ during the same combustion cycle; a (third) command signal to inject a main (third) pilot quantity of fuel ($Q_{P3}$), greater than $Q_{P1}$ and $Q_{P2}$, after another (second) calibrated dwell time ($T_{D2}$) between $Q_{P2}$ and $Q_{P3}$ during the same combustion cycle; and a (fourth) command signal to inject a post (fourth) pilot quantity of fuel ($Q_{P4}$), less than $Q_{P3}$, after a third dwell time ($T_{D3}$) between $Q_{P3}$ and $Q_{P4}$ during the same combustion cycle. The vehicle controller also transmits a (fifth) command signal to inject yet another (fifth) quantity of fuel ($Q_{P5}$) prior to injecting $Q_{P1}$ with a (fourth) dwell time ($T_{D4}$) between $Q_{P1}$ and $Q_{P5}$.

Other aspects of the present disclosure are directed to motor vehicles equipped with reciprocating-piston-type compression-ignition engine assemblies with multi-pulse fuel injection capabilities. A "motor vehicle," as used herein, may include any relevant vehicle platform, such as passenger vehicles (internal combustion engine, hybrid, fully or partially autonomous, etc.), commercial vehicles, industrial vehicles, tracked vehicles, off-road and all-terrain vehicles (ATV), farm equipment, boats, airplanes, etc. A motor vehicle is presented that includes a vehicle body fabricated with an engine compartment, and an internal combustion engine assembly mounted inside the engine compartment. This ICE assembly includes an engine block with one or more cylinder banks defining a series of cylinder bores. A piston is reciprocally movable within each one of the cylinder bores. Assorted engine valves are operable to regulate fluid intake and exhaust for the cylinder bores. Electronic fuel injectors operate to inject multiple pulses of fuel, per working combustion cycle, into each of these cylinder bores.

The motor vehicle also includes a resident or remote vehicle controller, such as a programmable engine control unit or powertrain control module, that communicates with the electronic fuel injectors. The vehicle controller is programmed to command the fuel injectors to inject, for a single combustion cycle: a first quantity of fuel ($Q_{P1}$) at a first crank angle; then a second quantity of fuel ($Q_{P2}$), distinct from $Q_{P1}$, after a predetermined (first) dwell time ($T_{D1}$) between $Q_{P1}$ and $Q_{P2}$; a third quantity of fuel ($Q_{P3}$), greater than $Q_{P1}$ and $Q_{P2}$, after a predetermined (second) dwell time ($T_{D2}$) between $Q_{P2}$ and $Q_{P3}$; and a fourth quantity of fuel ($Q_{P4}$), less than $Q_{P3}$, after a predetermined (third) dwell time ($T_{D3}$) between $Q_{P3}$ and $Q_{P4}$. For the same combustion cycle, the controller may also command the fuel injectors to inject another initial pilot quantity of fuel ($Q_{P5}$) prior to injecting $Q_{P1}$.

Additional aspects of the present disclosure are directed to non-transitory, computer readable media storing instructions executable by at least one of one or more processors of one or more in-vehicle electronic control units. These instructions, when executed, cause the ECU(s) to perform various operations, which may include, in any order and in any combination with any features presented in this disclosure: transmitting a first command signal to the fuel injectors of an ICE assembly to inject a first pilot quantity of fuel (QP1) during a single combustion cycle; transmitting a second command signal to the fuel injectors to inject a second pilot quantity of fuel (QP2), distinct from QP1, after a first dwell time (TD1) between QP1 and QP2 during the same combustion cycle; transmitting a third command signal to the fuel injectors to inject a third pilot quantity of fuel (QP3), greater than each of QP1 and QP2, after a second dwell time (TD2) between QP2 and QP3 during the same combustion cycle; and transmitting a fourth command signal to the fuel injectors to inject a fourth pilot quantity of fuel (QP4), less than QP3, after a third dwell time (TD3) between QP3 and QP4 during the same combustion cycle. Optional instructions may cause a vehicle controller to transmit a fifth command signal to the fuel injectors to inject a fifth pilot quantity of fuel (QP5) prior to injecting QP1 during the single combustion cycle.

For any of the aforementioned implementations, the initial and post pilot quantities ($Q_{P1}$, $Q_{P4}$ and $Q_{P5}$) are each approximately 8-10% QT for the single combustion cycle, where the corresponding calibrated dwell times ($T_{D1}$, $T_{D3}$ and $T_{D4}$) are each approximately 0.3-0.5 ms. Optionally, the auxiliary pilot quantity ($Q_{P2}$) is approximately 20-30% of the QT, while the main pilot quantity ($Q_{P3}$) is approximately 40-50% of the QT. As yet another option $T_{D2}$ may be calculated as $T_{D2}$=min.HS−$NOD_4$+$NCD_3$, where min.HS is the minimum hydraulic separation allowed between two consecutives events, where "separation" is typified as the hydraulic time between the end of injection (EOI) and a start of injection (SOI) of the next event; $NOD_4$ is a needle open delay of the event 4, typified as the time between a start of electric signal and the SOI; and $NCD_3$ is a needle close delay of the pilot 3, typified as the time between the end of the electric signal and the EOI.

The above summary is not intended to represent every embodiment or every aspect of the present disclosure. Rather, the foregoing summary merely provides an exemplification of some of the novel aspects and features set forth herein. The above features and advantages, and other features and advantages of the present disclosure, will be readily apparent from the following detailed description of representative embodiments and representative modes for carrying out the present disclosure when taken in connection with the accompanying drawings and the appended claims.

BRIEF DESCRIPTION OF THE DRAWINGS

FIGS. 4A and 4B are graphs of combustion noise (in decibels) vs. dwell time (in milliseconds (ms)) and combustion noise (dB) vs. Q3 control pilot duration (in microseconds (μs)), respectively, for a representative multi-pulse injection pattern in accord with aspects of the disclosed concepts.

FIG. 5 is a graph of injection specific fuel consumption (ISFC; in grams per kilowatt hour (g/kwh)) and coefficient of variation (COV) of Net Mean Effective Pressure (NEMP; percentage %) vs. dwell time (ms) for a representative multi-pulse injection pattern in accord with aspects of the disclosed concepts.

FIG. 6 is a graph of Rate of Heat Release (RoHR; in joules per crank angle degrees (J/CAD)) vs. crank angle (CAD) for a representative multi-pulse injection pattern in accord with aspects of the disclosed concepts.

Figure 1:
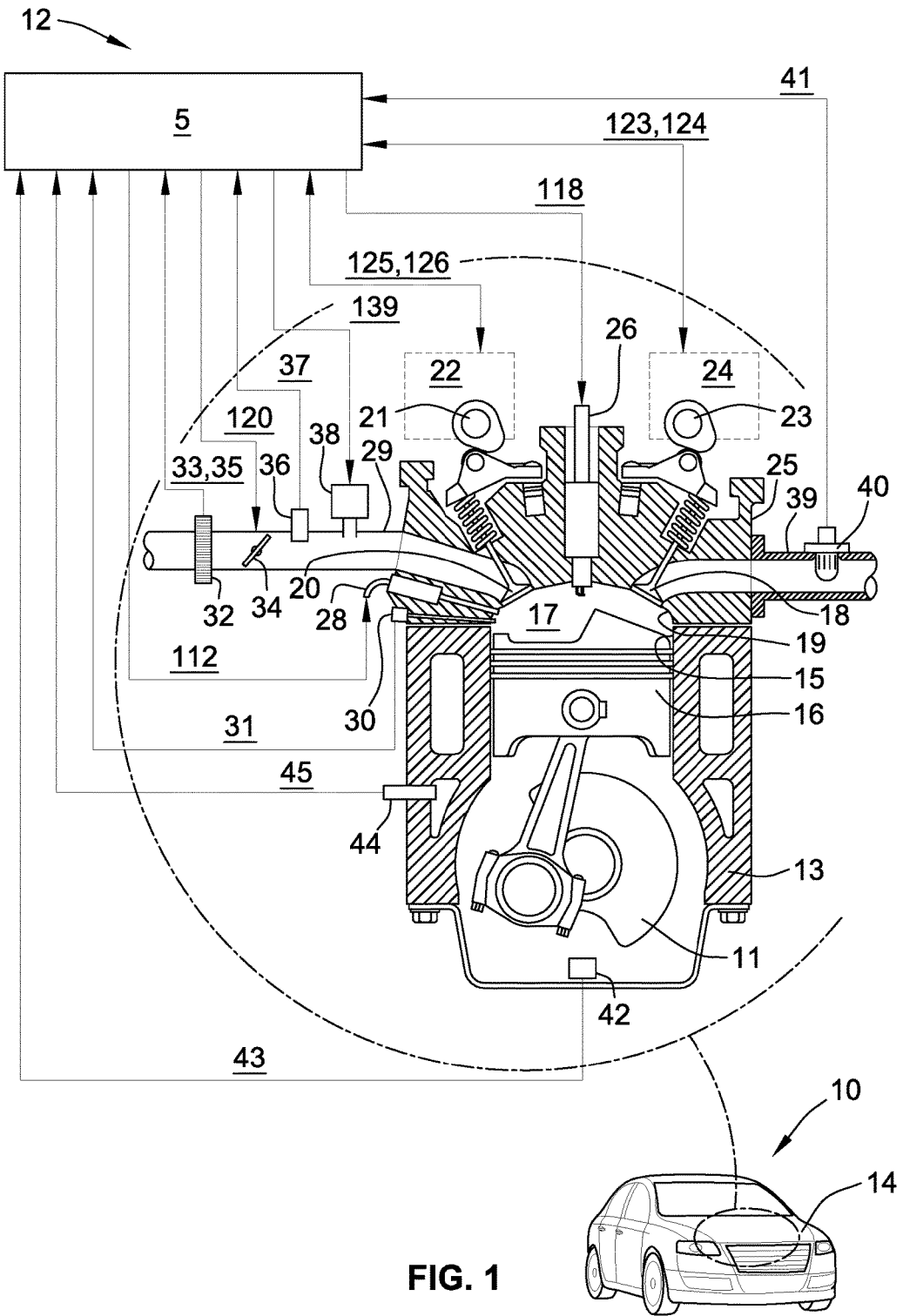
FIG. 1 is a front perspective-view illustration of a representative motor vehicle with an inset schematic illustration of a representative direct-injection reciprocating-piston type internal combustion engine assembly with multi-pulse fuel delivery capabilities in accordance with aspects of the present disclosure.

The present disclosure is amenable to various modifications and alternative forms, and some representative embodiments have been shown by way of example in the drawings and will be described in detail herein. It should be understood, however, that the novel aspects of this disclosure are not limited to the particular forms illustrated in the appended drawings. Rather, the disclosure is to cover all modifications, equivalents, combinations, subcombinations, permutations, groupings, and alternatives falling within the scope of this disclosure as defined by the appended claims.

DETAILED DESCRIPTION

This disclosure is susceptible of embodiment in many different forms. There are shown in the drawings and will herein be described in detail representative embodiments of the disclosure with the understanding that these illustrated examples are to be considered an exemplification of the disclosed principles and do not limit the broad aspects of the disclosure to the representative embodiments. To that extent, elements and limitations that are disclosed, for example, in the Abstract, Summary, and Detailed Description sections, but not explicitly set forth in the claims, should not be incorporated into the claims, singly or collectively, by implication, inference or otherwise. For purposes of the present detailed description, unless specifically disclaimed: the singular includes the plural and vice versa; the words "and" and "or" shall be both conjunctive and disjunctive; the word "all" means "any and all"; the word "any" means "any and all"; and the words "including" and "comprising" and "having" and synonyms thereof mean "including without limitation." Moreover, words of approximation, such as "about," "almost," "substantially," "approximately," and the like, may be used herein in the sense of "at, near, or nearly at," or "within 3-5% of," or "within acceptable manufacturing tolerances," or any logical combination thereof, for example. As a final note, any reference to first, second, third, etc., in the claims, is not per se an indication of temporal sequence and, unless indicated otherwise, should not be construed as such.

Referring now to the drawings, wherein like reference numbers refer to like features throughout the several views, there is shown in FIG. 1 a perspective-view illustration of a representative automobile, which is designated generally at 10 and portrayed herein for purposes of discussion as a four-door sedan-style passenger vehicle. Mounted at a forward portion of the automobile 10, e.g., aft of a front bumper fascia and grille and forward of a passenger compartment, is an internal combustion engine (ICE) assembly 12 housed within an engine compartment covered by an engine hood 14. The illustrated automobile 10—also referred to herein as "motor vehicle" or "vehicle" for short—is merely an exemplary application with which many novel aspects and features of this disclosure can be practiced. In the same vein, implementation of the present concepts into a compression-ignited direct injection (CIDI) engine configuration should also be appreciated as an exemplary application of the novel concepts disclosed herein. As such, it will be understood that many aspects and features of the present disclosure can be applied to other engine architectures and utilized for any logically relevant type of motor vehicle. Lastly, the drawings presented herein are not necessarily to scale and are provided purely for instructional purposes. Thus, the specific and relative dimensions shown in the drawings are not to be construed as limiting.

There is shown in FIG. 1 an example of a multi-cylinder, dual overhead cam (DOHC), inline-type ICE assembly 12. The illustrated ICE assembly 12 is a four-stroke reciprocating-piston engine configuration that operates to propel the vehicle 10, for example, as a direct injection (DI) diesel engine, including gasoline and hybrid electric vehicle (HEV) variations thereof. The ICE assembly 12 can optionally operate in any of an assortment of selectable combustion modes, including a homogeneous-charge compression-ignition (HCCI) combustion mode and an adjustable-lift spark-ignition (SI) combustion mode. Additionally, the ICE assembly 12 can operate at a stoichiometric air-to-fuel ratio and/or at an air-to-fuel ratio that is primarily lean of stoichiometry. The illustrated engine assembly 12 is equipped with a series of reciprocating pistons 16 slidably movable in cylinder bores 15 of an engine block 13. The top surface of each piston 16 cooperates with the inner periphery of its corresponding cylinder 15 and a respective chamber surface 19 of a cylinder head 25 to define a variable volume combustion chamber 17. Each piston 16 is connected to a rotating crankshaft 11 by which linear reciprocating motion of the pistons 16 is output, for example, to a power transmission (not shown) as rotational motion to drive one or more road wheels.

An air intake system transmits intake air to the cylinders 15 through an intake manifold 29, which directs and distributes air into the combustion chambers 17 via intake runners of the cylinder head 25. The engine's air intake system has airflow ductwork and various electronic devices for monitoring and regulating incoming air flow. The air intake devices can include, as a first non-limiting example, a mass airflow sensor 32 for monitoring mass airflow (MAF) 33 and intake air temperature (IAT) 35. A throttle valve 34 controls airflow to the ICE assembly 12 in response to a control signal (ETC) 120 from a programmable engine control unit (ECU) 5. A pressure sensor 36 in the intake manifold 29 monitors, for instance, manifold absolute pressure (MAP) 37 and barometric pressure. An optional external flow passage (not shown) recirculates exhaust gases from engine exhaust to the intake manifold 29, having a control valve in the nature of an exhaust gas recirculation (EGR) valve 38. The programmable engine control unit 5 controls mass flow of exhaust gas to the intake manifold 29 by controlling opening/closing of the EGR valve 38 via EGR command 139. In FIG. 1, the arrows connecting ECU 5 with the various components of the ICE assembly 12 are emblematic of electronic signals or other communication exchanges by which data and/or control commands are transmitted from one component to the other. In addition, the ICE assembly 12 may include a turbocharger to increase the volume and pressure of air inside the combustion chambers.

Airflow from the intake manifold 29 into the combustion chamber 17 is controlled by one or more intake engine valves 20. Evacuation of exhaust gases out of the combustion chamber 17 to an exhaust manifold 39 is controlled by one or more exhaust engine valves 18. These engine valves 18, 20 are illustrated herein as spring-biased poppet valves; however, other known types of engine valves may be employed. The representative ICE assembly 12 valve train system is equipped to control and adjust the opening and closing of the intake and exhaust valves 20, 18. These two VCP/VLC devices 22 and 24 are configured to control and operate an intake camshaft 21 and an exhaust camshaft 23, respectively. The rotations of the intake and exhaust camshafts 21 and 23 are linked to and indexed to rotation of the crankshaft 11, thus linking openings and closings of the intake and exhaust valves 20, 18 to positions of the crankshaft 11 and the pistons 16. The intake VCP/VLC device 22 may be fabricated with a mechanism operative to switch and control valve lift of the intake valve(s) 20 in response to a control signal (iVLC) 125, and variably adjust and control phasing of the intake camshaft 21 for each cylinder 15 in response to a control signal (iVCP) 126. In the same vein, the exhaust VCP/VLC device 24 may include a mechanism operative to variably switch and control valve lift of the exhaust valve(s) 18 in response to a control signal (eVLC) 123, and variably adjust and control phasing of the exhaust camshaft 23 for each cylinder 15 in response to a control signal (eVCP) 124. The VCP/VLC devices 22 and 24 can be actuated using any one of electro-hydraulic, hydraulic, electro-mechanic, and electric control force, in response to the respective control signals eVLC 123, eVCP 124, iVLC 125, and iVCP 126.

With continuing reference to the representative configuration of FIG. 1, ICE assembly 12 employs a direct-injection fuel injection subsystem with multiple high-pressure electronic fuel injectors 28 that directly inject pulses of fuel into the combustion chambers 17. As shown, each cylinder 15 is provided with one or more fuel injectors 28, which activate in response to an injector pulse width command (INJ_PW) 112 from the ECU 5. These fuel injectors 28 are supplied with pressurized fuel by a fuel distribution system. One or more or all of the fuel injectors 28 can be operable, when activated, to inject multiple fuel pulses—a succession of first, second, third, etc., infusions of fuel mass—per working combustion cycle into a corresponding one of the engine cylinders 15. ICE assembly 12 employs a compression-ignition procedure (for diesel engine architectures) or a spark-ignition procedure (for gasoline engine architectures) by which fuel-combustion-initiating energy, such as elevated in-chamber temperatures provided by compressed air or as an abrupt electrical discharge provided via a spark plug 26 in response to a spark command (IGN) 118, ignites cylinder charges in each of the combustion chambers 17. For some applications, the fuel injectors 28 may take on the form of an electronically-controlled, common-rail fuel injector architecture that operates, e.g., at 2000 bar fuel rail pressure with a normally-off solenoid-driven mode of operation.

The ICE assembly 12 is equipped with various sensing devices for monitoring engine operation, including a crank sensor 42 having an output indicative of crankshaft rotational position, e.g., crank angle and/or speed (RPM) signal 43. A temperature sensor 44 is configured to monitor, for example, one or more engine-related (e.g., coolant, fuel, etc.) temperatures, and output a signal 45 indicative thereof. An in-cylinder combustion sensor 30 is configured to monitor combustion-related variables, such as in-cylinder combustion pressure, charge temperature, fuel mass, air-to-fuel ratio, etc., and output a signal 31 indicative thereof. An exhaust gas sensor 40 is configured to monitor an exhaust-gas related variables, e.g., actual air/fuel ratio (AFR), burned gas fraction, etc., and output a signal 41 indicative thereof.

The combustion pressure and the crankshaft speed can be monitored by the ECU 5, for example, to determine combustion timing, i.e., timing of combustion pressure relative to the crank angle of the crankshaft 11 for each cylinder 15 for each working combustion cycle. It should be appreciated that combustion timing may be determined by other methods. Combustion pressure may be monitored by the ECU 5 to determine an indicated mean effective pressure (IMEP) for each cylinder 15 for each working combustion cycle. The ICE assembly 12 and ECU 5 cooperatively monitor and determine states of IMEP for each of the engine cylinders 15 during each cylinder firing event. Alternatively, other sensing systems may be used to monitor states of other combustion parameters within the scope of the disclosure, e.g., ion-sense ignition systems, EGR fractions, and non-intrusive cylinder pressure sensors.

Control module, module, control, controller, control unit, processor and similar terms mean any one or various combinations of one or more of Application Specific Integrated Circuit(s) (ASIC), electronic circuit(s), central processing unit(s) (e.g., microprocessor(s)), and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The ECU can be designed with a set of control routines executed to provide the desired functions. Control routines are executed, such as by a central processing unit, and are operable to monitor inputs from sensing devices and other networked control modules, and execute control and diagnostic routines to control operation of devices and actuators. Routines may be executed at regular intervals, for example each 100 microseconds (μs), 3.125, 6.25, 12.5, 25 and 100 milliseconds during ongoing engine and vehicle operation. Alternatively, routines may be executed in response to occurrence of an event.

With the implementation of high-pressure electronic fuel injectors to deliver accurate, closely coupled sequential pulse injections in a single working cycle, the illustrated engine assembly can be operated to minimize engine combustion noise without negatively affecting exhaust emissions. In addition, increased charge cooling caused by fuel vaporization can be effectively controlled to manipulate ignition delay and achieve lower emissions and fuel consumption. With a five-pulse injection pattern, as described below, computational results have shown that dwell between a third and a fourth (main) injection pulse can be controlled to decrease combustion noise so long as the dwell is not decreased beyond a calibrated minimum value. The heat of vaporization needed for the evaporation of fuel spray in the main (fourth) injection pulse helps to locally cool the environment and influences the ignition delay of fuel injected in three initial (smaller) pulses. This cooling can be selectively modified to control the rate of pressure rise in the cylinder which, in turn, affects combustion noise.

Figure 3:
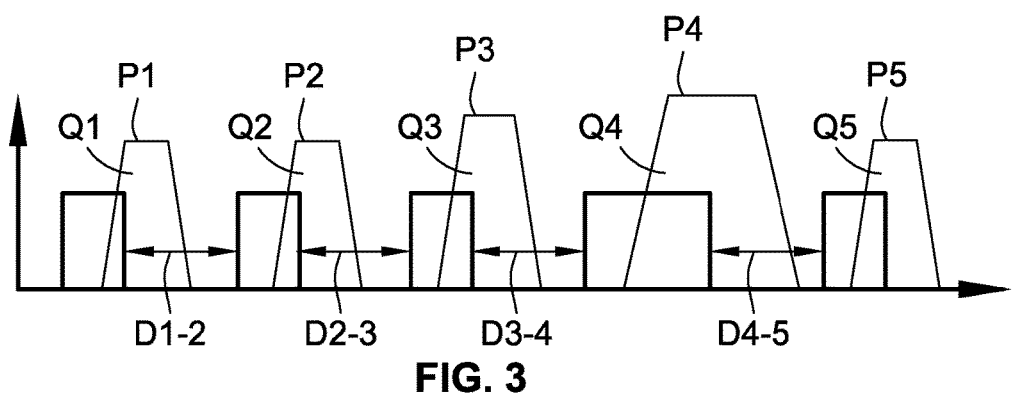
FIG. 3 is a chart illustrating injection pressure vs. start of energizing (SOE) injector time for a representative multi-pulse injection pattern in accordance with aspects of the present disclosure.

In an example, such as that shown in FIG. 3 of the drawings, a 5-pulse injection train may comprise two initial pilot pulses P1 and P2 and a final post pulse P5 that are relatively small (e.g., each less than 10% QT), as compared to the main and auxiliary pulses P3 and P4, and share a common injection rate (e.g., approximately 15 mg/ms) and a common injection pulse duration (e.g., approximately 0.1-0.2 ms). By comparison, the third pulse P3 in the train is larger than the two initial pulses (e.g., approximately 20-30% QT) utilizing a higher injection rate (e.g., about 18-20 mg/ms) and a higher injection pulse duration (e.g., about 0.20-0.25 ms). The main pulse P4, which follows the two initial pulses P1, P2 and the auxiliary pulse P3, injects the largest amount of fuel (e.g., approximately 40-50% QT) with the largest injection rate (e.g., about 25-28 mg/ms) and injection pulse duration (e.g., about 0.5-0.7 ms). With this sequence, there are four dwells D1-2, D2-3, D3-4 and D4-5 for the five pulses P1-P5. In the current example, dwell times D1-2, D2-3, D4-5 between the first two pulses, between the second and third pulses, and between the main and final pulses, respectively, are substantially the same and may be kept substantially constant. The start of injection (SOI) of the main pulse and, hence, the SOI of the final pulse may be kept fixed. Conversely, the dwell time D3-4 between the auxiliary and main pulses may be selectively modified; thus, the SOI of the first pulse is changed to maintain a fixed SOI of the main pulse.

Figure 2:
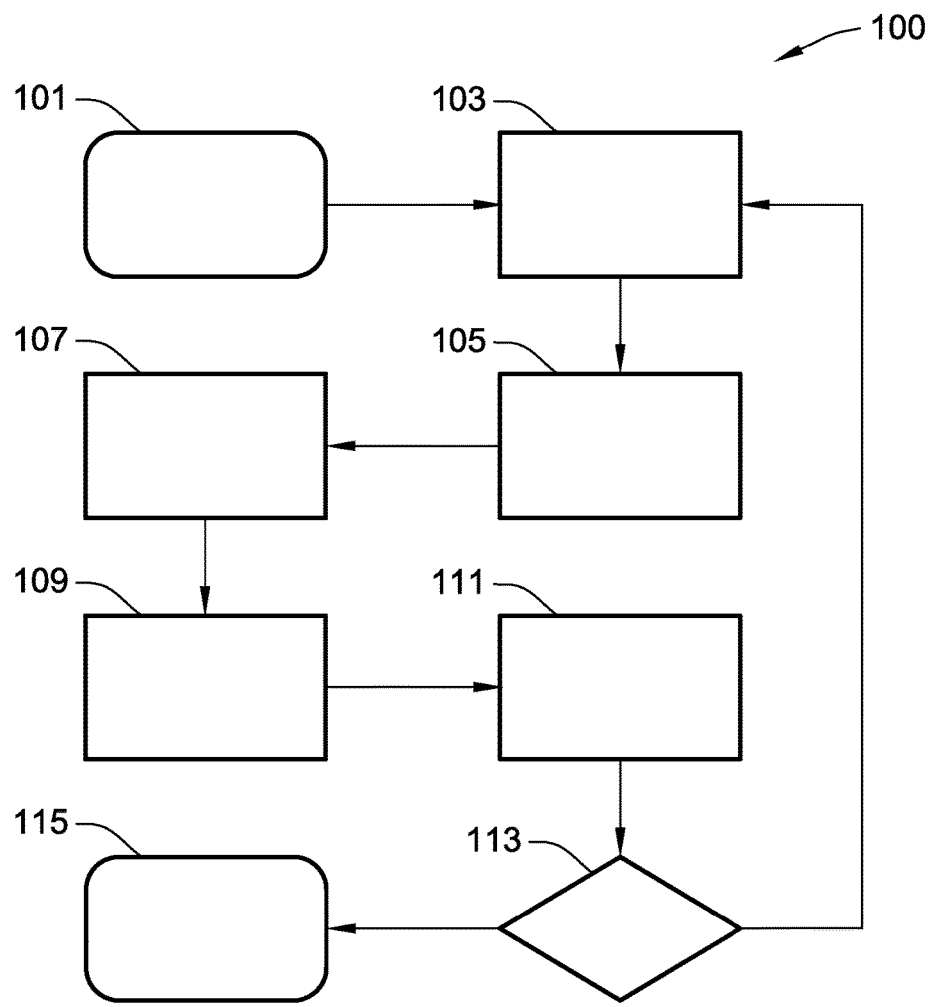
FIG. 2 is a flowchart for a representative multi-pulse fuel delivery control scheme or algorithm that may correspond to memory-stored instructions executed by onboard control-logic circuitry, programmable electronic control unit, or other computer-based device of a motor vehicle in accord with aspects of the disclosed concepts.

With reference now to the flow chart of FIG. 2, an improved method or control strategy for operating a multi-pulse fuel injection system, such as the direct-injection fuel subsystem of FIG. 1, to regulate the introduction of fuel into the combustion chambers of a multi-cylinder multi-stroke engine, such as ICE assembly 12 of FIG. 1, is generally described at 100 in accordance with aspects of the present disclosure. Some or all of the operations illustrated in FIG. 2 and described in further detail below can be representative of an algorithm that corresponds to processor-executable instructions that may be stored, for example, in main or auxiliary or remote memory, and executed, for example, by an ECU, a central processing unit (CPU), an onboard or remote control logic circuit, or other module or device, to perform any or all of the above and/or below described functions associated with the disclosed concepts. It should also be recognized that the order of execution of the illustrated operation blocks may be changed, additional blocks may be added, and/or some of the blocks described may be modified, eliminated, or combined.

Method 100 of FIG. 2 starts at terminal block 101 with initiating a multi-pulse fuel injection control protocol. In essence, terminal block 101 could be replaced with a decision block for a powertrain control module or electronic control unit, such as programmable engine control unit 5, to assess whether or not multi-pulse injection is needed or otherwise desired. By way of non-limiting example, current engine operating conditions can be monitored in real-time to determine if the vehicle is executing a transient engine operation (e.g., acceleration or deceleration) or the engine is operating at or above a key part-load operation (2000 RPM and 5 Bar BMEP). In such instances, a multi-pulse fuel injection control protocol may be desired to help improve overall engine operation. Direct injection of multiple fuel pulses per cylinder per combustion cycle may also be desirable in specifically designated "special operation" regimes, e.g., to provide additional energy for converter lightoff, a smooth idle, and reduced engine combustion noise. Optional applications may require receiving an activation input from the vehicle driver or other occupant through an electronic driver information center (DIC), which may be implemented through a touchscreen video display panel that is positioned in a center stack of the passenger compartment. For some applications, terminal block 101 is merely an initialization operation (START) that does not require actively determining whether or not the control protocol has been activated or is otherwise desirable.

With continuing reference to FIG. 2, method 100 proceeds to process block 103 with memory-stored, processor-executable instructions for a vehicle controller, such as ECU 5 of FIG. 1, to transmit one or more electronic signals (also referred to herein as "fifth command signal") to a selected one or ones or all of the electronic fuel injectors to inject an initial (first) fuel pulse P1 (FIG. 3) per cylinder per combustion cycle during implementation of the multi-pulse fuel injection control protocol. This initial fuel pulse P1 may comprise a calibrated pilot quantity Q1 (also referred to herein as "fifth pilot quantity of fuel" or $Q_{P5}$). In the same vein, process block 105 provides executable instructions for causing a vehicle controller to transmit one or more electronic signals (also referred to herein as "first command signal") to the electronic fuel injector(s) to inject another initial (second) fuel pulse P2 (FIG. 3) per cylinder per combustion cycle. Like P1, this particular fuel pulse P2 may comprise a calibrated pilot quantity Q2 (also referred to herein as "first pilot quantity of fuel" or $Q_{P1}$). For at least some preferred implementations, pilots P1 and P2 share a common pilot quantity, e.g., each inject approximately 8-10% or, for some embodiments, about 9% of the total fuel injection quantity (QT) for the combustion cycle. First and second fuel pulses P1 and P2 are shown in FIG. 3 separated by a calibrated hydraulic dwell time D1-2 (also referred to herein as "fourth dwell time" or $T_{D4}$). For at least some preferred implementations, first dwell time D1-2 is approximately 0.3-0.5 milliseconds (ms) or, for some embodiments, about 0.4 ms.

After injecting the two initial pilot pulses P1, P2, the method 100 continues to process block 107 with programmable, executable instructions for a vehicle controller to transmit one or more electronic signals (also referred to herein as "second command signal") to some or all of the electronic fuel injectors to inject an auxiliary (third) fuel pulse P3 per cylinder per combustion cycle. This auxiliary pulse P3 may comprise an engine-calibrated auxiliary pilot quantity Q3 (also referred to herein as "second pilot quantity of fuel" or $Q_{P2}$), which is greater than either of the first two fuel pulse pilot quantities Q1, Q2. For at least some implementations, P3 is approximately 20-30% QT or, in some embodiments, about 25% QT for each combustion cycle during implementation of the multi-pulse fuel injection control protocol. The second and third fuel pulses P2 and P3 are shown in FIG. 3 separated by an engine-calibrated hydraulic dwell time D2-3 (also referred to herein as "first dwell time" or $T_{D1}$). According to the illustrated example, the first two hydraulic dwell times D1-2 and D2-3 are substantially equal with a time window, e.g., of approximately 0.3-0.5 ms or, for some embodiments, about 0.4 ms.

Upon completion of the auxiliary pilot pulse P3, the vehicle controller transmits one or more electronic signals (also referred to herein as "third command signal") to the fuel injector(s) to inject a main (fourth) fuel pulse P4 during the same combustion cycle, which may be part of executing process block 109. As the largest of the individual fuel pulses, the main fuel pulse P4 may comprise an engine-calibrated main quantity Q4 (also referred to herein as "third pilot quantity of fuel" or $Q_{P3}$), which is greater than each of the first three pilot quantities Q1, Q2 and Q3. For at least some implementations, P4 injects approximately 40-50% QT or, for some embodiments, about 48% QT for the combustion cycle. Third and fourth fuel pulses P3 and P4 are shown in FIG. 3 separated by a distinct calibrated hydraulic dwell time D3-4 (also referred to herein as "second dwell time" or $T_{D2}$). For some implementations, this main dwell time D3-4 is approximately 0.15 and 0.30 ms or, for some embodiments, about 0.22 ms depending on application and/or design restrictions.

Research has shown that the injection dwell time D3-4 between the auxiliary and main pilots P3, P4 can be optimized for increased engine noise reduction and reduced engine emissions. For instance, main dwell time D3-4 ($T_{D2}$) can be calculated as:

$$D3\text{-}4 = \min.HS - NOD_4 + NCD_3$$

where min.HS is the minimum hydraulic separation allowed between two consecutives events, where "separation" is typified as the hydraulic time between the end of injection (EOI) and a start of injection (SOI) of the next event; $NOD_4$ is a needle open delay of the event 4, typified as the time between a start of electric signal and the SOI; and $NCD_3$ is a needle close delay of the pilot 3, typified as the time between the end of the electric signal and the EOI. In particular, min.HS is a calculated minimum hydraulic separation between EOI and SOI, and $NOD_4$ is the time delay between the SOI and the start of energizing (SOE) the fuel injectors for the fourth pulse P4. Moreover, $NCD_3$ is the time delay between the end of energizing (EOE) the fuel injectors for the third pulse P3 and the EOI. For at least some applications, the total time between SOI and EOI for the entire injection profile may be approximately 2.0-2.5 ms or, for some embodiments, about 2.3 ms. Individual pulses may range from 0.1-0.5 ms. In at least some embodiments, D3-4 may be approximately 4° crank angle (° CA) or 333 μs, 2° CA or 167 μs, or 0.8° CA or 67 μs. An example of an optimum hydraulic dwell time D3-4 between third and fourth pulses P3 and P4 is 5.2° CA. When the P3-P4 dwell time D3-4 is modified, it may be desirable that pilots P1, P2 and P3 be jointly shifted in order to keep the SOI of main pilot P4 at the same crank angle location.

To complete the 5-pulse injection train, the method 100 proceeds to process block 111 with programmable, executable instructions for a vehicle controller to transmit one or more electronic signals (also referred to herein as "fourth command signal") to any or all of the injectors to inject a final (fifth) post pulse P5 per cylinder per combustion cycle. This final post pulse P5 may comprise an engine-calibrated pilot quantity Q5 (also referred to herein as "fourth pilot quantity of fuel" or $Q_{P4}$) that is less than each of the third and fourth pilot quantities Q3, Q4. The two initial pilot pulses P1, P2 and the final pilot pulse P5 may share a common pilot quantity, e.g., each inject approximately 8-10% QT or, for some embodiments, about 9% QT for the combustion cycle. The final two fuel pulses P4 and P5 are shown in FIG. 3 separated by an engine-calibrated final hydraulic dwell time D4-5 (also referred to herein as "a third dwell time" or $T_{D3}$) during the combustion cycle. Similar to the first and second dwell times D1-2, D2-3, the final dwell time D4-5 may be approximately 0.3-0.5 milliseconds (ms) or, for some embodiments, about 0.4 ms. An injection pressure for the initial and final fuel pulses P1, P2 and P5 increase 20-60%. Once completed, the 5-pulse injection train of FIG. 3 may provide an overall injected fuel mass per cylinder per cycle of approximately 15-18 mg or, for some embodiments, about 16.5 mg. At block 113, the method 100 determines if an adjustment should be made to any of the parameters implemented in block 103-111 (e.g., should timing, quantity, dwell, etc., be modulated). The method 100 may then be terminated at terminal block 115.

FIG. 4A graphically illustrates combustion noise (dB; y-axis) vs. dwell time (ms; x-axis) to show how combustion noise changes for an injection pattern main dwell D3-4 sweep. In particular, by reducing the dwell time between injection pilot events P3 and P4, combustion noise is reduced. According to the illustrated example, engine noise can be reduced to approximately 79 dB for 0.220 ms dwell. However, if main dwell time D3-4 is reduced below a calibrated minimum value, say 0.200 ms, engine noise increases. FIG. 4B, on the other hand, graphically illustrates combustion noise (dB; y-axis) vs. Q3 control pilot duration (μs; x-axis) to show how combustion noise changes for an injection pilot Q3 sweep. This sweep is performed for the optimized dwell time identified in FIG. 4A—0.220 ms—and covers the third pilot pulse Q3 masses from approximately 1.2 to 5.0 mg and a range of about 8% to 35% of the total injected mass. As shown, increasing Q3 helps to reduce the main injection quantity since the total injected mass may be held constant for all cases. In the illustrated example, the best case for noise is obtained using 25% QT of the total injection quantity for the auxiliary pilot 3. For reference, an energizing time of 190 μs is used to obtain a minimum noise value of 79 dB.

FIG. 5 illustrates injection specific fuel consumption (g/kwh; left y-axis) and coefficient of variation (COV) of NMEP (%; right y-axis) vs. dwell time (ms) to show the effect of the main dwell D3-4 on fuel consumption (ISFC) and combustion stability (COV). ISFC is an indication of the engine fuel consumption and efficiency, whereas COV is an indication of the stability of the combustion process and expected cycle-to-cycle repeatability. Representative of the injection strategy presented in FIG. 3, FIG. 5 shows that broadly changing the D3-4 parameter does not drastically degrade ISFC or COV of NMEP—combustion is kept stable and fuel consumption remains relatively constant around the set value. Some previously developed multiple-injection strategies increase COV because there is latent interaction between injection pulses (i.e., injection definition is incorrect). In addition, if the injection strategy does not properly define the individual injection pulses, the engine may start to behave erratically and, consequently, increase fuel consumption. By using five pulse injection events and selectively modifying the main dwell time for the temporal separation between main and aux pilots, the COV of NMEP is less than 2% and fuel consumption change is less than 0.05%.

Turning next to FIG. 6, Rate of Heat Release (j/CAD) is compared with crank angle (CAD) to show that, when RoHR is smooth and constrained to one peak heat event, engine noise is reduced even if maximum heat release rates are the same. Consequently, the 5-injection train can be optimized to find a dwell separation that provides a RoHR shape with a minimum amount of pressure changes. As explained above, separation optimization can be achieved, for example, by calculating a main dwell time D3-4 as min.HS–$NOD_4$+$NCD_3$. Fuel consumption based on ISFC and combustion stability based on COV of NMEP do not change when this injection strategy is applied.

The graphically illustrated results presented in FIGS. 4-6 may be representative of a multi-cylinder, turbocharged diesel engine. In a more specific example, the engine includes 83 mm bore cylinders, with a 90.4 mm stroke and a displacement of 0.49 L (i.e., for each cylinder from a 2 L 4-cylinder engine), and a Swirl Number of 1.5 at intake valve closure (IVC). This representative engine architecture is equipped with a turbocharger, and an exhaust gas recirculation (EGR) subsystem. The engine also employs high-pressure electronic fuel injectors, a common rail, and fuel pump. An injector control module generates and transmits the electrical signals that open and close the injectors at the desired timings with the desired fuel quantities and number of injection pulses in each working combustion cycle. Sensors are located in the cylinders to measure pressure as a function of engine crank angle rotation. This signal may be used to calculate RoHR and the combustion noise using determined methods.

Aspects of this disclosure may be implemented, in some embodiments, through a computer-executable program of instructions, such as program modules, generally referred to as software applications or application programs executed by an onboard vehicle computer. The software may include, in non-limiting examples, routines, programs, objects, components, and data structures that perform particular tasks or implement particular abstract data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, bubble memory, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by remote-processing devices that are linked through a communications network. In a distributed-computing environment, program modules may be located in both local and remote computer-storage media including memory storage devices. Aspects of the present disclosure may therefore, be implemented in connection with various hardware, software or a combination thereof, in a computer system or other processing system.

Any of the methods described herein may include machine readable instructions for execution by: (a) a processor, (b) a controller, and/or (c) any other suitable processing device. Any algorithm, software, or method disclosed herein may be embodied in software stored on a tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in other manners (e.g., it may be implemented by an application specific integrated circuit (ASIC), a programmable logic device (PLD), a field programmable logic device (FPLD), discrete logic, etc.). Further, although specific algorithms are described with reference to flowcharts depicted herein, persons of ordinary skill in the art will readily appreciate that many other methods of implementing the example machine readable instructions may alternatively be used.

While aspects of the present disclosure have been described in detail with reference to the illustrated embodiments, those skilled in the art will recognize that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined in the appended claims. Moreover, the present concepts expressly include any and all combinations and subcombinations of the preceding elements and features.

What is claimed:

1. A method for operating a fuel injection system of an internal combustion engine (ICE) assembly, the ICE assembly including multiple cylinders each with a respective piston reciprocally movable therein, and multiple fuel injectors each operable to inject multiple pulses of fuel per combustion cycle into a respective one of the cylinders, the method comprising:

transmitting, via a vehicle controller to the fuel injectors, a first command signal to inject a first pilot quantity of fuel ($Q_{P1}$) for each combustion cycle in a series of combustion cycles;

transmitting, via the vehicle controller to the fuel injectors, a second command signal to inject a second pilot quantity of fuel ($Q_{P2}$), distinct from the $Q_{P1}$, after a first dwell time ($T_{D1}$) between $Q_{P1}$ and $Q_{P2}$ for each of the combustion cycles in the series of combustion cycles;

transmitting, via the vehicle controller to the fuel injectors, a third command signal to inject a third pilot quantity of fuel ($Q_{P3}$), greater than the $Q_{P1}$ and $Q_{P2}$, after a second dwell time ($T_{D2}$) between $Q_{P2}$ and $Q_{P3}$ for each of the combustion cycles; and transmitting, via the vehicle controller to the fuel injectors, a fourth command signal to inject a fourth pilot quantity of fuel ($Q_{P4}$), less than the $Q_{P3}$, after a third dwell time ($T_{D3}$) between $Q_{P3}$ and $Q_{P4}$ for each of the combustion cycles.

2. The method of claim 1, further comprising transmitting, via the vehicle controller to the fuel injectors, a fifth command signal to inject a fifth pilot quantity of fuel ($Q_{P5}$) prior to injecting the $Q_{P1}$ for each of the combustion cycles.

3. The method of claim 2, wherein the $Q_{P1}$ is equal to the $Q_{P5}$, and wherein a fourth dwell time ($T_{D4}$) between $Q_{P1}$ and $Q_{P5}$ is equal to the second dwell time.

4. The method of claim 3, wherein the $Q_{P1}$ and $Q_{P5}$ are each approximately 8-10% of a total fuel injection quantity (QT) for each of the combustion cycles.

5. The method of claim 3, wherein the $T_{D1}$ and $T_{D4}$ are each approximately 0.3-0.5 milliseconds (ms).

6. The method of claim 1, wherein the $Q_{P1}$ and $Q_{P4}$ are each approximately 8-10% of a total fuel injection quantity (QT) for each of the combustion cycles.

7. The method of claim 1, wherein the $Q_{P2}$ is approximately 20-30% of a total fuel injection quantity (QT) for each of the combustion cycles.

8. The method of claim 1, wherein the $Q_{P3}$ is approximately 40-50% of a total fuel injection quantity (QT) for each of the combustion cycles.

9. The method of claim 1, wherein the $T_{D1}$ and $T_{D3}$ are each approximately 0.3-0.5 milliseconds (ms).

10. The method of claim 1, wherein the $T_{D2}$ is calculated as:

$$T_{D2} = \min.HS - NOD_4 + NCD_3$$

where HS is a hydraulic separation between an end of injection (EOI) and a start of injection (SOI); NOD is a needle open delay; and NCD is a needle close delay.

11. The method of claim 1, wherein the $T_{D2}$ is between about 0.17 and 0.42 ms.

12. The method of claim 1, wherein an injection pressure of $Q_{P1}$, $Q_{P2}$ and $Q_{P4}$ is approximately 1.2 to 1.6 bars.

13. The method of claim 1, wherein the ICE assembly is a direct-injection compression-ignited diesel engine.

14. A motor vehicle comprising:
a vehicle body defining an engine compartment;

an internal combustion engine assembly disposed within the engine compartment, the ICE assembly including an engine block defining a plurality of cylinder bores, a plurality of pistons each reciprocally movable within a respective one of the cylinder bores, and a plurality of electronic fuel injectors each operable, when activated, to inject multiple pulses of fuel per combustion cycle into a respective one of the cylinder bores; and a vehicle controller communicatively connected to the electronic fuel injectors, the vehicle controller being programmed to:

command one or more of the fuel injectors to inject a first pilot quantity of fuel ($Q_{P1}$) for each combustion cycle in a series of combustion cycles;

command one or more of the fuel injectors to inject a second pilot quantity of fuel ($Q_{P2}$), distinct from $Q_{P1}$, after a first dwell time ($T_{D1}$) between $Q_{P1}$ and $Q_{P2}$ for each of the combustion cycles;

command one or more of the fuel injectors to inject a third pilot quantity of fuel ($Q_{P3}$), greater than $Q_{P1}$ and $Q_{P2}$, after a second dwell time ($T_{D2}$) between $Q_{P2}$ and $Q_{P3}$ for each of the combustion cycles; and command one or more of the fuel injectors to inject a fourth pilot quantity of fuel ($Q_{P4}$), less than the $Q_{P3}$, after a third dwell time ($T_{D3}$) between $Q_{P3}$ and $Q_{P4}$ for each of the combustion cycles.

15. A non-transitory, computer readable medium storing instructions executable by an onboard controller of a motor vehicle, the motor vehicle including an internal combustion engine assembly with multiple cylinders each having a respective piston movable therein, and multiple fuel injectors each operable to inject multiple pulses of fuel per combustion cycle into a respective one of the cylinders, the instructions causing the vehicle controller to perform steps comprising:

transmitting a first command signal to the fuel injectors to inject a first pilot quantity of fuel ($Q_{P1}$) for each combustion cycle in a series of combustion cycles;

transmitting a second command signal to the fuel injectors to inject a second pilot quantity of fuel ($Q_{P2}$), distinct from the $Q_{P1}$, after a first dwell time ($T_{D1}$) between $Q_{P1}$ and $Q_{P2}$ for each of the combustion cycles in the series of combustion cycles of the ICE assembly;

transmitting a third command signal to the fuel injectors to inject a third pilot quantity of fuel ($Q_{P3}$), greater than the $Q_{P1}$ and $Q_{P2}$, after a second dwell time ($T_{D2}$) between $Q_{P2}$ and $Q_{P3}$ for each of the combustion cycles; and transmitting a fourth command signal to the fuel injectors to inject a fourth pilot quantity of fuel ($Q_{P4}$), less than the $Q_{P3}$, after a third dwell time ($T_{D3}$) between $Q_{P3}$ and $Q_{P4}$ for each of the combustion cycles.

16. The non-transitory, computer readable medium of claim 15, further comprising instructions causing the vehicle controller to transmit a fifth command signal to the fuel injectors to inject a fifth pilot quantity of fuel ($Q_{P5}$) prior to injecting the $Q_{P1}$ for each of the combustion cycles.

17. The non-transitory, computer readable medium of claim 16, wherein the $Q_{P1}$ is equal to the $Q_{P5}$, and wherein a fourth dwell time ($T_{D4}$) between $Q_{P1}$ and $Q_{P5}$ is equal to the second dwell time.

18. The non-transitory, computer readable medium of claim 17, wherein the $Q_{P1}$, $Q_{P4}$ and $Q_{P5}$ are each approximately 8-10% of a total fuel injection quantity (QT) for each of the combustion cycles, and wherein the $T_{D1}$, $T_{D3}$ and $T_{D4}$ are each approximately 0.3-0.5 ms.

19. The non-transitory, computer readable medium of claim 18, wherein the $Q_{P2}$ is approximately 20-30% of the QT and the $Q_{P3}$ is approximately 40-50% of the QT.

20. The non-transitory, computer readable medium of claim 15, wherein the $T_{D2}$ is calculated as:

$$T_{D2} = \min.HS - NOD_4 + NCD_3$$

where HS is a hydraulic separation between an end of injection (EOI) and a start of injection (SOI); NOD is a needle open delay; and NCD is a needle close delay.

* * * * *